Jan. 2, 1934. W. O. AMSLER 1,941,779
GLASS TANK
Filed May 5, 1932 3 Sheets-Sheet 1
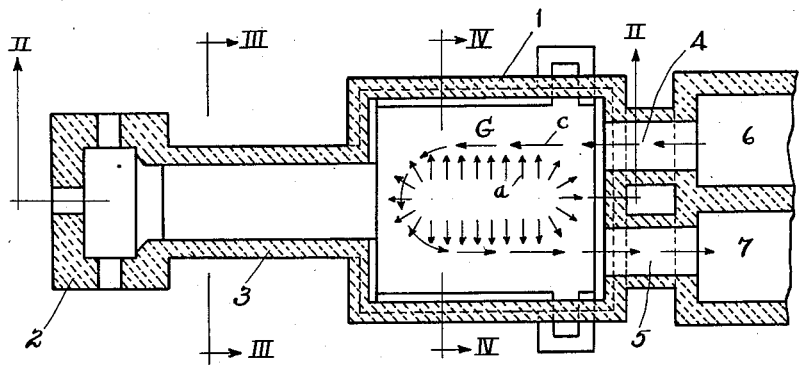
Fig. I
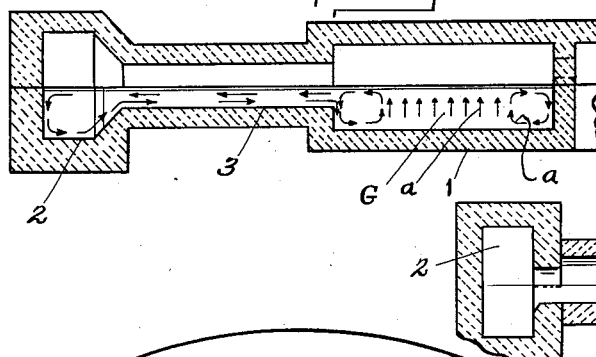
Fig. II
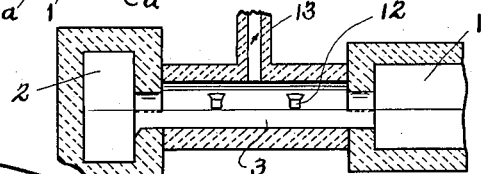
Fig. IIa
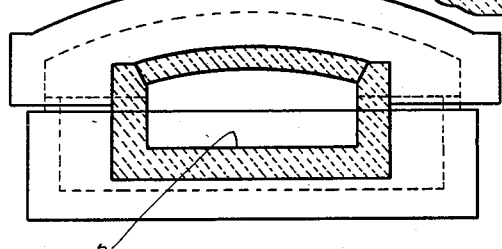
Fig. III
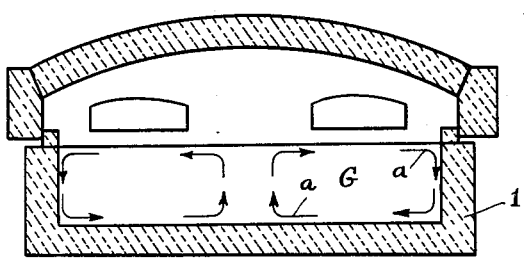
Fig. IV
INVENTOR
Walter O. Amsler
by Christy, Christy and Wharton
his attorneys Jan. 2, 1934.                W. O. AMSLER                1,941,779
                              GLASS TANK
                            Filed May 5, 1932              3 Sheets-Sheet 2
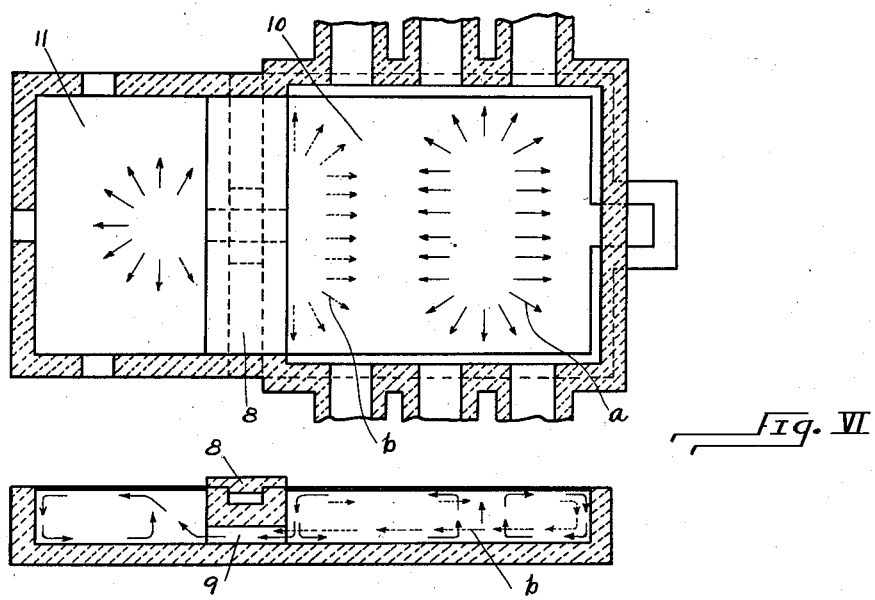
Fig. VI
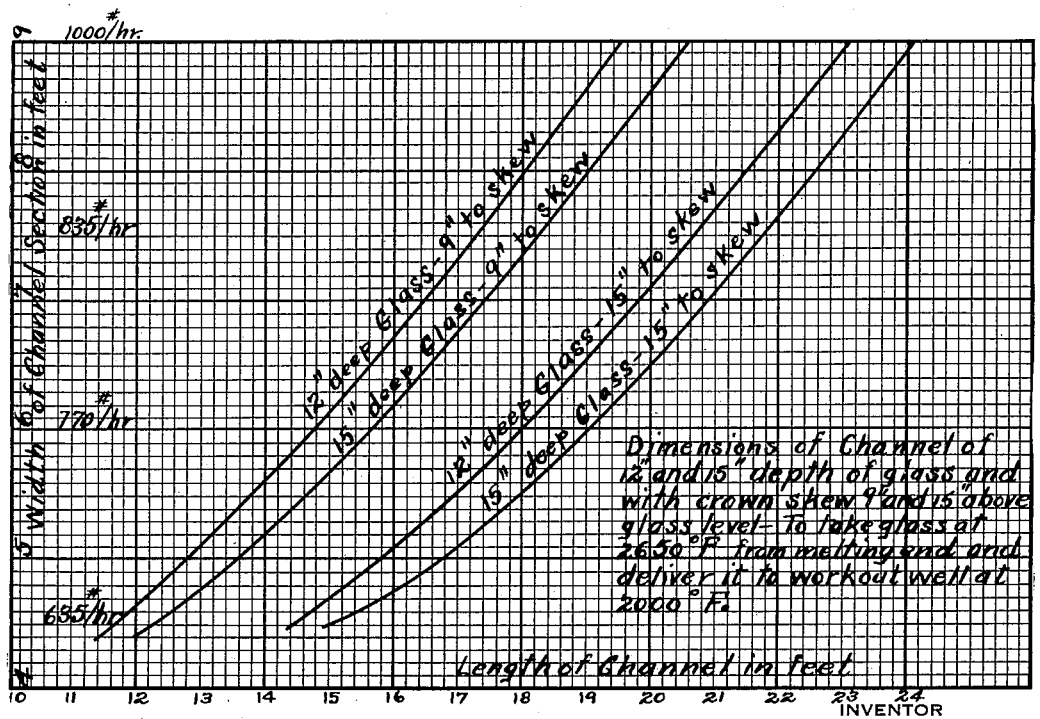
Fig. V Jan. 2, 1934.  W. O. AMSLER  1,941,779
GLASS TANK
Filed May 5, 1932  3 Sheets-Sheet 3
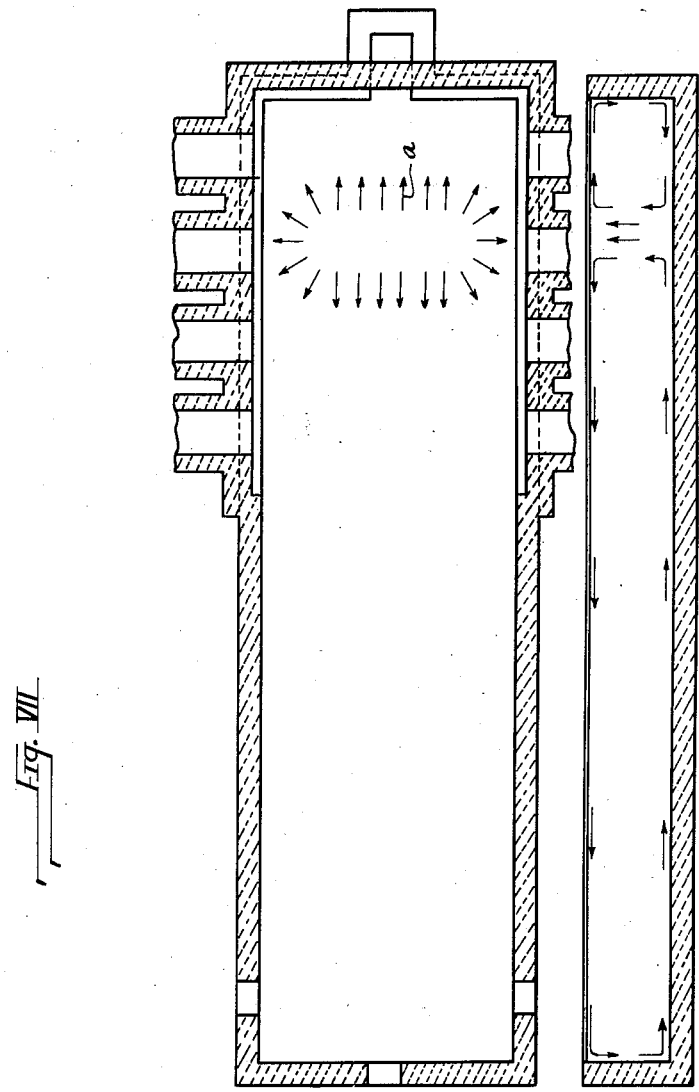
Fig. VII
INVENTOR
Walter O. Amsler
by Christy Christy and Wharton
his attorneys Patented Jan. 2, 1934

1,941,779

UNITED STATES PATENT OFFICE 1,941,779

GLASS TANK

Walter O. Amsler, Toledo, Ohio, assignor to Simplex Engineering Company, Washington, Pa., a corporation of Delaware Application May 5, 1932. Serial No. 609,390

5 Claims. (Cl. 49—54)

My invention relates to the making and refining of glass and consists in improvements in the form and structure of the tank in which glass is melted and refined and from which the melted and refined glass is taken, to be shaped and solidified into useful form; and the method, as well, which is performed in the operation of the structure. The objects of the invention are economy of structure and of operation and superiority in quality of product.

In an application for Letters Patent of the United States filed by me July 28, 1931, Serial No. 553,531, I have shown and described certain improvements in tank structure and consequent improvements in the production of glass. My present invention proceeds in the same direction and opens a new and wider field.

A glass tank embodying my invention is illustrated in the accompanying drawings, in which Fig. I is a view of the tank in horizontal section; Fig. II is a view in longitudinal section, on the plane indicated by the line II—II, Fig. I; Fig. IIa is a fragmentary view, corresponding to Fig. II, and illustrating a variation in detail; Figs. III and IV are views to larger scale and in transverse section, on the planes indicated, severally, at III—III and IV—IV, Fig. I; Fig. V is a graph, illustrating the inter-relation of certain dimensions in structure; Figs. VI and VII show in plan and in longitudinal section the glass-containing portions of two furnaces of now standard types, upon which the furnace of my present invention is an improvement.

All bodies of fluid which in different portions of their extent are of unequal temperature develop within themselves currents which tend to effect temperature equalization. Illustrations of this principle may be observed in the currents of the oceans; and, on smaller scale, in systems for heating houses by the circulation of hot water, and in the thermo-siphon systems employed in the radiators of automobile engines.

Glass is melted in a tank by means of a flame that plays over a portion of the surface of the charge; and the whole body of molten glass within the tank, being so rendered molten and so maintained in molten condition, is responsive to the same principle: currents flow superficially outward from the region over which the flames play toward the side walls of the tank; and, near the bottom of the tank, return currents flow in a direction inward from the side walls toward the portion of the molten body above which the flames are playing; adjacent the side walls the currents flow downward, and beneath the region upon which the flames play the glass is flowing in an ascending column.

Turning first to Figs. VI and VII, here are shown,—in Fig. VI, the conventional bridge and throat furnace, such as is commonly used for making glass for vessels—cheap tableware, pressed ware, etc.; and, in Fig. VII, the conventional plate-glass furnace. In the plan views of these two furnaces, the areas surrounded by arrows *a* in full line are the areas of highest temperature, the "hot regions," upon which the furnace flames play. Beneath these areas the glass within the tank is moving in ascending stream; from these areas at the surface currents of glass are flowing outward to the walls of the tank; at the walls, the currents turn downward; while at the bottom of the tank, flow is inward, from the walls toward the ascending stream first mentioned. (Compare the sectional views.)

The furnace of bridge type, illustrated in Fig. VI, is characterized by a bridge wall 8 which extends across the tank from side wall to side wall, dividing the space within the tank into two compartments, which communicate one with the other only through the vertically constricted throat 9 at the bottom of the tank. The compartment 10 to the rear of the bridge wall (to the right, Fig. VI) is the melting compartment; the compartment 11 to the front is the working compartment, from which glass is withdrawn. Furnaces of this type afford their maximum commercial output, if the hot region center at a point from one half to one third of the distance from the charging end (the right-hand end, Fig. VI) to the bridge wall 8. Longitudinally of the furnace, circulation is set up in two streams (compare, again, the sectional view). These two streams are distinguished as the primary circuit (that in which the glass at the surface flows toward the rear wall, at the charging end of the furnace—toward the right, Fig. VI) and the secondary circuit (that in which the direction of surface flow is toward the bridge wall). It is into the primary circuit that the raw materials are progressively charged, and in it the greater part of the refining takes place. If the hot region be shifted from the optimum position indicated toward the bridge wall, the secondary circuit within the melting compartment more or less completely disappears and the circulation is along lines indicated by the dotted arrows *b*; unrefined glass then, in increased measure, finds its way through the throat 9 and into the working compartment 11; and the product of the furnace becomes more seriously defective.

It is because of the limitation upon the quality of the glass that may be produced in the furnace of bridge type (Fig. VI) that for plate-glass making and window-glass making the more expensive and less economical furnace of Fig. VII is employed. Here no bridge wall is found; there is but a single compartment. The important function of the bridge, in the furnace already described, is to bring the temperature of the glass down from the degree requisite for refining (approximately 2650° F.) to the temperature of working (approximately 2000°). In the furnace of Fig. VII, lacking a bridge, the secondary circuit extends freely to the front wall—that is to say, to the working end—of the tank; and, in order to attain at the working end the requisite relatively low temperature, the tank is necessarily greatly prolonged. The volume of glass which in the furnace of Fig. VII returns from the working end to the hot region is very many times greater than the volume drawn from the furnace; and, inasmuch as all the glass that flows in the secondary circuit is with each round cooled to working temperature and heated again to refining temperature, it is manifest that operation involves the expenditure of large quantities of heat which do not contribute directly to production.

In all glass-making operations the batch will advantageously be converted into glass at the highest temperature maintainable, without too rapid destruction of the containing structure; this means, practically, that the maximum temperature of the glass within the furnace is about 2650° F. Even at such temperatures the glass is still so viscous that small gas bubbles cannot escape at the surface if they lie deeper than a tenth of an inch below the surface; and it is for this reason that in the refining chamber the glass should advance repeatedly, many times through the primary circuit. The speed of making and refining glass depends upon the number of times that, within a given interval, each portion of the mass is brought to the surface in a high-temperature region. The temperature of 2650° is, however, far higher than that at which the glass can be worked, and, practically, the glass advancing from the melting and refining region, must come to the region of withdrawal at a temperature approximating 2000° F.

In my earlier application, alluded to above, I formed intermediate the length of the tank a partition, extending from the side walls part way across the width of the tank, and dividing the tank into a melting compartment and a cooling compartment communicating through a laterally constricted neck. My present invention involves further modification in the structure and arrangement of the tank.

Referring to Figs. I–IV of the drawings, the tank of my invention includes a melting compartment, to which the numeral 1 is immediately applied, a relatively small working compartment or well 2, and a comparatively long narrow and shallow connecting channel 3. These three portions of the tank, however, are adapted to contain a single body of molten glass whose surface extends in continuity and in a single plane throughout all the extent of the tank. This is best shown in Fig. II.

The desired melting conditions are maintained in the melting compartment, and as here shown flame flows in the horseshoe-shaped course indicated by the arrows c from port to port, between ports 4 and 5, arranged side by side in the rear wall of the furnace. Regenerators 6 and 7 are indicated, in communication with the ports. This horseshoe-shaped flame, old in itself, is peculiarly suited to my purposes, for the axis of the hot zone is on the center line of the furnace, and practically the whole surface of the bath in the melting compartment may be played upon by the refining flame, and this is the condition of maximum efficiency.

The working compartment 2 is relatively small, but it may be deep; its walls are well insulated, to keep heat radiation low and to maintain the temperature of the body of glass within the compartment as nearly uniform as may be. There will, however, be some escape of heat and some consequent circulation of glass within the delivery compartment.

The connecting channel 3 is a very important element of the tank of my invention, and in the careful designing and constructing of this element the invention is realized. In consequence of careful experiment and observation it is possible to determine the dimensions of the channel, so as to maintain in the working compartment a body of glass in the best condition to work properly.

To determine properly the proportions of the channel it is necessary to know, first of all, the optimum temperatures to be maintained, both in the melting compartment and in the working compartment. These may, for example, be 2650° and 2000° F. respectively. The channel, including the arch which closes it in above, is made of such materials and of such dimensions that the heat loss through the walls will be substantially equal to the heat input which comes from the melting compartment through the space above the surface of the molten glass, plus the sensible heat of the incoming stream of glass, less the sensible heat of the return stream back to the melting compartment again (for a secondary circuit is maintained through channel and working compartment), and less the sensible heat of the glass withdrawn from the working compartment. (It is assumed, in this statement, that no heat will flow to or from the arch which closes the channel above, either from the melting compartment or to the delivery compartment, due to the flow of gases. It is possible by proper manipulation of the dampers in the stack, to establish such an equilibrium of gas pressure with respect to the channel arch, but omission of this factor from the calculation leaves it a possibility, by manipulation of such dampers, to make compensation for varying weather conditions and other variables, and to maintain at all times the optimum temperature in the delivery compartment.)

The width of the channel is governed by the width of the working well, and that in turn is governed by the necessities of the machine or machines which take from the working well their supply of molten glass. I have perceived that the narrower the channel, the shorter it may be; the shallower it is, the shorter it may be; and the smaller the space between the surface of the glass and the arch opening into the melting end, the shorter the channel may be. Furthermore, the material for the walls of the channel may be selected with the end in view of gaining most economically the desired cooling effect; for, manifestly, the greater the conductivity of the material of which the walls are built (and this may be modified, within the limits of structural safety), the more rapid the heat loss, and correspondingly the shorter the channel need be. And I have discovered how, with any given material, the length of the channel may be worked out to afford optimum results. Reference to the graph, Fig. V, will show these relations. In general, I have found that the cross-sectional area of the channel should be less than one fourth, and preferably will be less than one sixth of that of the melting compartment. There is a limit beyond which the channel should not be reduced in its cross-sectional area: the volume of the stream of glass flowing in secondary circuit through the channel should always exceed the volume of the withdrawal from the working compartment, to the end that the body of glass in the working compartment shall continue in constant motion.

The following calculation in a specific installation is given by way of example. In this case the bottom of the tank was built of 6-inch Corhart blocks, resting on a layer of 2½-inch clay brick; the side walls were built of 9-inch silica brick within 4½ inches of clay brick; and the crown of the tank was built of 9-inch silica brick.

| | |
|---|---|
| Width of channel | 4.50 feet |
| Width of glass in channel | 1.25 feet |
| Cross-sectional area of space in channel above glass | 82 sq. ft. |
| Temp. of glass attained in melting compartment | 2,650° F. |
| Temp. of glass at delivery | 2,000° F. |
| Weight of molten glass per cu. ft. | 152 lbs. |
| Specific heat of glass per lb. | .151 B. t. u. |
| Weight of glass drawn per hour | 635 lbs. |
| Radiation constant of 90% black body per hr. | .155 B. t. u. |

From these data and the heat transmitting characteristics of its component materials the heat loss of the glass flowing in the channel per foot of length of the outside surface of the channel was calculated to be 55,530 B. t. u. per hour.

By observation the following matters were determined:

| | |
|---|---|
| Surface speed per hour in the channel | 95 feet |
| Depth of outflowing stream in channel | .48 feet |
| Depth of returning stream in channel | .77 feet |
| Temp. of returned glass | 2,500° |

Having these data in hand, the following equation is to be solved:

$$Qr = A \times .155 \left[ \left(\frac{Tm+460}{100}\right)^4 - \left(\frac{Tw+460}{100}\right)^4 \right]$$

In this equation $Qr$ stands for heat radiated into channel from melting compartment;

$A$ stands for the area of opening of the melting chamber into the channel above the glass, and this of the case in hand is 8.2 sq. ft.;

The factor .155 is the radiation and absorption factor of the surfaces affected by the heat radiated into the channel from the melting end. It is determined by experiment, and is the numerical expression in B. t. u. per hr. per sq. ft.;

$Tm$ is the temperature of the glass in the melting chamber at its entrance to the channel; and $Tw$ is the temperature of the glass in the work out well.

Having all these factors, the formula works out, and the value of $Qr$, that is to say, of the heat radiated into the channel from the melting compartment, is 509,000 B. t. u. per hr.

$Qs$, the net sensible heat carried into the channel by the glass, is determined by multiplying together the area of the entering stream, the average speed, the weight per cu. ft., the specific heat, the temperature, and the mean rate of flow, as a minuend, and subtracting from it, multiplied together as a subtrahend, the weight of the glass in the return stream, the specific heat, and the temperature of the returned glass. The remainder on the figures given above amounts to 520,200 B. t. u. per hour.

$Qd$ stands for the heat in the glass drawn. It will be the product of the weight of glass drawn, the specific heat, and the temperature, and this on the figures given will be 192,000 B. t. u. per hr.

$Qt$, which stands for the total heat to be dissipated in the channel, will then equal $Qs+Qr-Qd$, and this amounts to 837,500 B. t. u. per hour.

Since the channel will dissipate an average of 55,530 B. t. u. per hour per foot of length, the length necessary to deliver glass to the delivery compartment at 2000° will be $$\frac{837,500}{55,530} = 15.1 \text{ ft.}$$

In Fig. IIa I show a refinement in the construction of the channel by means of which the furnace may be adapted to varying requirements, and by virtue of which in the course of operation it may be adapted to changing conditions. In the side walls of the channel and above the level of the glass air ports 12 are formed and in the roof a damper-controlled chimney 13. By such means a cooling stream of air (which, if desired, may be cut off entirely) is caused to flow over the glass advancing in the channel, and the volume of that stream and consequently its cooling effect may, within limits, be varied at pleasure.

It will be observed of the operation of the furnace described that the glass is, by the constriction of the tank in the channel portion, cooled at a relatively rapid rate in its advance from the region of heat to the region of withdrawal; and that the rate of cooling is variable, within the control of the attendant.

The weight of the glass drawn will ordinarily be relatively small, and may be assumed to be not more than one fifth of the volume of the stream which circulates through the delivery compartment. Such being the case, such variation in the rate of withdrawal as may be incident to ordinary operation has but little effect to disturb the temperature of the glass in the delivery compartment.

I have found that, whereas in furnaces such as are commonly employed, a production of 35% of first quality is considered good, I am able in the operation of the furnace described to produce glass of which 95% and more is of first quality.

I claim as my invention:

1. A glass tank adapted to contain a body of molten glass with continuous surface at uniform level throughout all its extent and including a melting compartment, a working compartment, and a channel connecting the two said compartments, the channel being of less depth than the two said compartments, of a cross-sectional area not greater than one fourth of that of the melting compartment and of a length responsive to the formula $$\frac{Qs+Qr-Qd}{n}$$

in which $Qs$ represents the net sensible heat carried into the channels by the glass flowing from the melting compartment, $Qr$ represents the heat radiated into the channel from the melting compartment, $Qd$ represents the heat in the glass drawn from the working compartment, and $n$ represents the heat loss per lineal foot of the channel.

2. The method herein described of operating a glass tank which consists in causing the molten glass maintained in a single continuous pool to circulate in a closed cycle of flow in an outgoing superficial stream and a returning sub-surface stream and through a passage constricted from the bottom upwardly between spaced-apart regions of heating and of delivery, and varying as operation progresses the cooling conditions to which in such constricted passage the glass is subject.

3. A glass tank including a melting compartment of greater capacity, a working compartment of less capacity, and a channel connecting the two said compartments, the glass-confining walls of the two said compartments being continuous throughout with the glass-confining walls of the interconnecting channel, whereby compartments and channel together are adapted to contain a single body of molten glass with continuous surface at uniform level throughout all its extent, the said channel being of a depth less than that of the melting compartment and of a cross-sectional area not greater than one fourth of that of the melting compartment.

4. A glass tank including a melting compartment of greater capacity, a working compartment of less capacity and a channel connecting the two said compartments, the said channel being of a depth less than that of either of the said compartments and of a cross-sectional area not greater than one fourth of that of the melting compartment, the glass-confining walls of the said compartments being continuous throughout with the glass-confining walls of the said channel, whereby compartments and channel together are adapted to contain a single body of molten glass with continuous surface at uniform level throughout all its extent.

5. A glass tank adapted to contain a single body of molten glass with continuous surface at uniform level throughout all its extent, and including a melting compartment, a working compartment, and a channel of reduced width and depth connecting the two said compartments, the walls of the working compartment being of relatively great heat-insulating character and effect, and the walls of the channel being of relatively great heat-conducting character and effect, whereby a minor portion of the entire batch of molten glass, reduced gradually from refining temperature to working temperature, may be maintained at working temperature, ready on demand for delivery.

WALTER O. AMSLER.